US012794146B2

(12) United States Patent
Dorsey

(10) Patent No.: US 12,794,146 B2
(45) **Date of Patent: *Nov. 10, 2026**

(54) FLEXIBLE POLYMER ANTENNA WITH MULTIPLE GROUND RESONATORS

(71) Applicant: Taoglas Group Holdings Limited, Enniscorthy (IE)

(72) Inventor: Jason Philip Dorsey, Oceanside, CA (US)

(73) Assignee: Taoglas Group Holdings Limited, Enniscorthy (IE)

( * ) Notice: Subject to any disclaimer, the term of this patent is extended or adjusted under 35 U.S.C. 154(b) by 16 days.

This patent is subject to a terminal disclaimer.

(21) Appl. No.: 18/921,408

(22) Filed: Oct. 21, 2024

(65) Prior Publication Data

US 2025/0158292 A1 May 15, 2025

Related U.S. Application Data

(63) Continuation of application No. 18/217,731, filed on Jul. 3, 2023, now Pat. No. 12,132,260, which is a continuation of application No. 17/717,473, filed on Apr. 11, 2022, now Pat. No. 11,695,221, which is a continuation of application No. 17/140,666, filed on
(Continued)

(51) Int. Cl.

| | |
|---|---|
| ***H01Q 21/20*** | (2006.01) |
| ***H01Q 1/24*** | (2006.01) |
| ***H01Q 1/36*** | (2006.01) |
| ***H01Q 1/38*** | (2006.01) |
| ***H01Q 1/48*** | (2006.01) |

(Continued)

(52) U.S. Cl.
CPC ............ *H01Q 21/20* (2013.01); *H01Q 1/241* (2013.01); *H01Q 1/242* (2013.01); *H01Q 1/36* (2013.01); *H01Q 1/38* (2013.01); *H01Q 1/48* (2013.01); *H01Q 5/30* (2015.01); *H01Q 5/371* (2015.01)

(58) Field of Classification Search
CPC .......... H01Q 1/241; H01Q 1/242; H01Q 1/36; H01Q 1/38; H01Q 1/48; H01Q 5/30; H01Q 5/307; H01Q 5/371; H01Q 5/10; H01Q 9/04; H01Q 21/20
See application file for complete search history.

(56) References Cited

U.S. PATENT DOCUMENTS

| | | | |
|---|---|---|---|
| 7,501,991 | B2 | 3/2009 | Yeap |
| 8,502,747 | B2 | 8/2013 | Chang et al. |

(Continued)

FOREIGN PATENT DOCUMENTS

| | | |
|---|---|---|
| GB | 2544415 | 5/2017 |
| TW | I441388 | 4/2012 |

*Primary Examiner* — Hoang V Nguyen
(74) *Attorney, Agent, or Firm* — Garson & Gutierrez, PC

(57) ABSTRACT

The disclosure concerns an antenna assembly having a substrate with an antenna radiating element and a ground conductor disposed on the substrate, the ground conductor further characterized by a plurality of ground resonators, wherein a length associated with each of the ground resonators increases as the ground resonators are distanced from the antenna radiating element. Additionally, a coaxial cable is routed around the antenna assembly for configuring the coaxial cable as an additional ground resonator associated with the antenna assembly. The resulting antenna provides wide band performance between 700 MHz and 2700 MHz with improved efficiency compared with conventional antennas.

20 Claims, 4 Drawing Sheets

Related U.S. Application Data

Jan. 4, 2021, now Pat. No. 11,329,397, which is a continuation of application No. 16/665,942, filed on Oct. 28, 2019, now Pat. No. 10,886,633, which is a continuation of application No. 16/140,977, filed on Sep. 25, 2018, now Pat. No. 10,461,439, which is a continuation of application No. 15/351,263, filed on Nov. 14, 2016, now Pat. No. 10,103,451.

(60) Provisional application No. 62/254,140, filed on Nov. 11, 2015.

(51) Int. Cl.

*H01Q 5/30* (2015.01)
*H01Q 5/371* (2015.01)

(56) References Cited

U.S. PATENT DOCUMENTS

| | | | |
|---|---|---|---|
| 9,755,302 | B2 | 9/2017 | Flores-Cuadras et al. |
| 2005/0237244 | A1 | 10/2005 | Annabi et al. |
| 2006/0214867 | A1 | 9/2006 | Chen |
| 2007/0046557 | A1 | 3/2007 | Chen et al. |
| 2007/0159398 | A1 | 7/2007 | Tsai et al. |
| 2010/0090913 | A1 | 4/2010 | Liu |
| 2010/0245183 | A1 | 9/2010 | Hyvonen et al. |
| 2011/0279341 | A1 | 11/2011 | Chang et al. |
| 2012/0001818 | A1 | 1/2012 | Lee et al. |
| 2012/0127056 | A1 | 5/2012 | Park et al. |
| 2013/0249765 | A1 | 9/2013 | Su |
| 2015/0303556 | A1 | 10/2015 | Flores-Cuadras et al. |

FLEXIBLE POLYMER ANTENNA WITH MULTIPLE GROUND RESONATORS

CROSS-REFERENCE TO RELATED APPLICATIONS

This application is a continuation of, and claims the benefit of priority to, co-owned and co-pending U.S. patent application Ser. No. 18/217,731 filed on Jul. 3, 2023 of the same title, which is a continuation of, and claims the benefit of priority to U.S. patent application Ser. No. 17/717,473 filed on Apr. 11, 2022 of the same title, which is a continuation of, and claims the benefit of priority to U.S. patent application Ser. No. 17/140,666 filed on Jan. 4, 2021 of the same title, now U.S. Pat. No. 11,329,397 issued on May 10, 2022, which is a continuation of, and claims the benefit of priority to co-owned U.S. patent application Ser. No. 16/665,942 filed on Oct. 28, 2019 of the same title, now U.S. Pat. No. 10,886,633 issued on Jan. 5, 2021, which is a continuation of, and claims the benefit of priority to, co-owned U.S. patent application Ser. No. 16/140,977, filed Sep. 25, 2018 of the same title, now U.S. Pat. No. 10,461,439 issued on Oct. 29, 2019, which is a continuation of, and claims the benefit of priority to, co-owned U.S. patent application Ser. No. 15/351,263, filed Nov. 14, 2016 of the same title, now U.S. Pat. No. 10,103,451 issued on Oct. 16, 2018, which claims the benefit of priority to co-owned U.S. Provisional Application Ser. No. 62/254,140 filed Nov. 11, 2015 of the same title, the contents of each of the foregoing being incorporated herein by reference in its entirety.

TECHNICAL FIELD

This invention relates to antennas for wireless communication; and more particularly, to an antenna fabricated on a flexible polymer substrate, the antenna including: a radiating element and a ground conductor forming a plurality of ground resonators for providing high performance over a wide bandwidth.

BACKGROUND

There is a continued need for improved antennas, especially flexible antennas, having a flexible configuration for placing on curved surfaces of various products, and being capable of tuning to wide bands (for example: 700 MHZ-2700 MHz range).

SUMMARY

A need exists for an antenna capable of multiple resonance frequencies at a wide band, for example between 700 MHz and 2700 MHZ, especially such an antenna that is capable of forming about a curved surface of a device.

After much testing and experimentation, the antenna architecture as disclosed herein has been discovered, which provides efficient signaling at multiple resonance frequencies over a very wide band between 700 MHz and 2700 MHz. The performance of the disclosed antenna exceeds that of conventional antennas and is further adapted on a flexible substrate and configured to conform about a curved device surface for integrating with a plurality of host devices.

In addition to the wide band performance, the flexible polymer substrate provides the capability to conform the antenna about a curved surface of a device. While curved, the antenna continues to exhibit efficient performance over a wide band.

DETAILED DESCRIPTION

Figure 1:
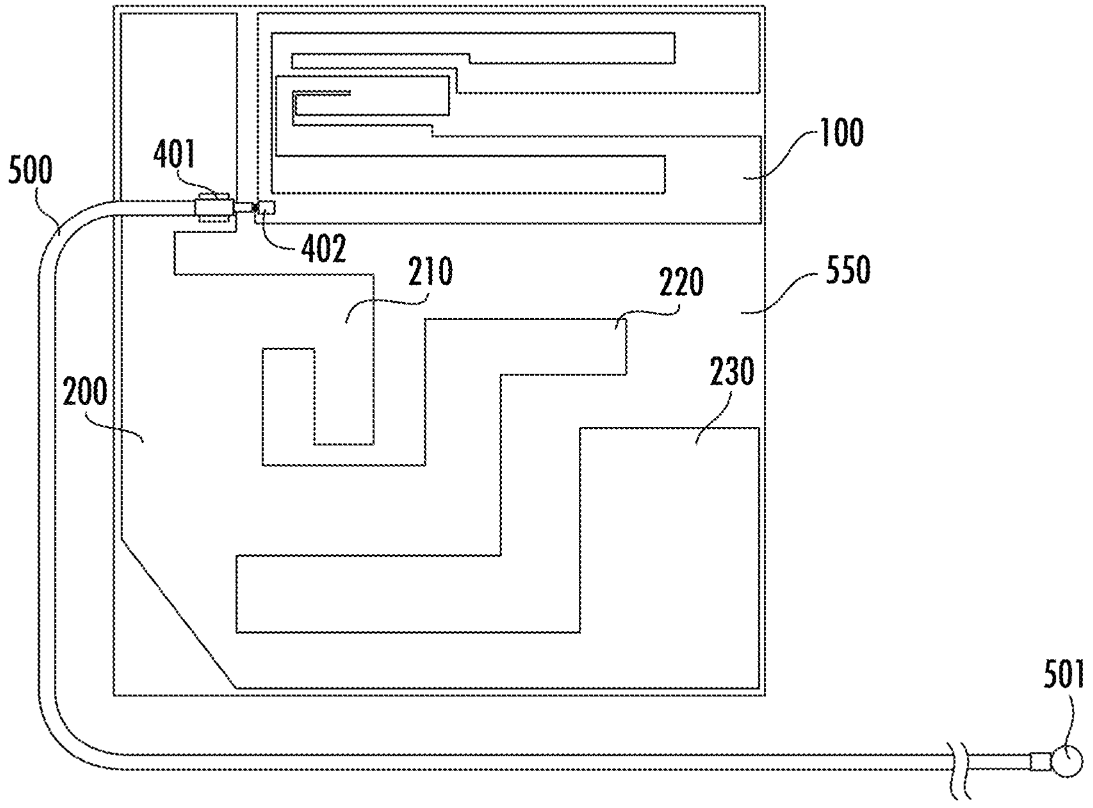
FIG. 1 shows an antenna assembly with multiple ground resonators, the antenna assembly includes a radiating element positioned on a substrate, and a ground conductor positioned on the substrate adjacent to the antenna radiating element, the ground conductor includes multiple resonating portions.

In various embodiments, an antenna is disclosed which includes: a substrate, an antenna radiating element disposed on the substrate, and a ground conductor, wherein the ground conductor comprises: a ground patch, a first ground resonator, a second ground resonator, and a third ground resonator; wherein the ground conductor surrounds the antenna radiating element about two sides thereof and provides for multiple resonant frequencies forming a wide band response.

The antenna radiating element of the antenna assembly (that which is fed by the center element of the coaxial cable) is known to work well in other designs provided that the ground plane is sufficiently large. A motivation of the instant antenna design is to improve the ground conductor of the antenna assembly to work with a flexible substrate and to achieve sufficient efficiency in the smallest form possible. In addition, the ground conductor is configured to allow the cable shield and its end connection to act as an extension to the ground plane.

Modern cellular applications, including 3G and 4G, often require the combination of high efficiency and small size over a large set of bands in the 700-2700 MHz range. The cable-fed flexible polymer antenna assembly is a commonly-used implementation of antennas for this market. It is often challenging to integrate such antennas into compact devices without degradation of return loss (and thus efficiency) due to proximity of nearby metal objects or improper routing of the cable.

This disclosure presents a novel antenna architecture with acceptable efficiency in a very small form using a known antenna radiating element and a unique multi-section wrapping ground conductor that is virtually extended by the feed cable. The structure was designed to concentrate the efficiency in those frequency bands where is it needed at the expense of those frequencies where the efficiency is not needed.

It is difficult to design an antenna with a small size that operates efficiently over all cellular bands in modern use.

On typical cable-fed quasi-dipoles, the ground is often too small for stable operation and the cable shield is relied upon to provide a ground conductor. This sort of cable-ground is non-ideal, as it cannot implement a resonant element.

For a small size antenna, in order to produce high efficiencies at low frequencies in the wide range of 700 MHz-960 MHz, it was discovered that the use of multiple wrapping ground resonators, each being progressively larger toward the outside, works well. Moreover, with the multiple ground resonators, the cable shield can act as the last resonator structure for the lowest frequency required.

It is known by experiment that covering the antenna radiating element with copper tape will produce low band performance that is not as good but still marginal and poor high band performance. It is also known that by covering the ground conductor with copper tape, the low band performance is nonexistent and high band performance is not as good but marginal. Therefore, it is necessary to have the proposed patterning on the ground conductor, not just a conductive sheet the same size.

A simple dipole would require approximately 210 mm of length to perform at 700 MHz.

With the disclosed antenna architecture, we measure high efficiencies down to 650 MHz within a space of 58 mm.times.67 mm. Thus, we can achieve better efficiencies at a much smaller size.

In addition, by forming the antenna assembly on a flexible substrate, we can conform the shape of the antenna assembly to any surface, such that the antenna can be mounted, or we can bend the antenna one time or multiple times.

The antenna has two main subsections: the antenna radiating element and the ground conductor. The ground conductor is novel in that it is composed of multiple subelements, each progressively larger and farther from the antenna radiating element, so that the last element is effectively the cable shield and its connection, i.e. typically a PCB ground. This gives a known and proper way to route the cable.

In one aspect, the antenna is combining the antenna radiating element with a new type of ground conductor composed of multiple (here three) sub-elements which wrap around and progressively get larger as the sub elements (resonators) approach the outer periphery of the antenna assembly. The cable shield will act as final element due to routing.

In another aspect, we propose using mini-coax cable as feeding technique of the antenna.

In yet another aspect, we propose manufacturing the antenna structure on flexible substrate, such as a polyimide (Kapton®) substrate, having the convenience of attached the antenna to any curved surface, or bend the antenna multiple times.

Example 1

Now turning to the drawings which illustrate an example, FIG. 1 shows an antenna assembly with multiple ground resonators, the antenna assembly includes a radiating element 100 positioned on a substrate 550, and a ground conductor 200 positioned on the substrate adjacent to the antenna radiating element, the ground conductor includes multiple resonating portions including a first ground resonator 210, a second ground resonator 220, and a third ground resonator 230. A coaxial cable 500, such as a micro coaxial cable, includes a center element which is soldered to a feed 402 of the radiating element 100 of the antenna. The center element of the coaxial cable is generally separated from a ground element by an insulator therebetween. The ground element 401 of the coaxial cable is soldered to the ground conductor 200 as shown. The coaxial cable 500 is then routed in typical fashion; i.e. around a periphery of the antenna assembly. Moreover, the cable generally includes a connector 501 for connecting to a radio circuit.

As appreciated from FIG. 1, the antenna assembly includes a radiating element 100 and ground conductor 200; wherein the ground conductor is configured to surround the antenna radiating element on two sides thereof. Moreover, the ground conductor includes a plurality of sub-elements (also called “resonators”), wherein a length of each resonator increases as distance of the resonator from the radiating element increases. The routed cable is configured to act as an additional resonator, and comprises a length larger than each of the other resonators of the ground conductor.

Figure 2:
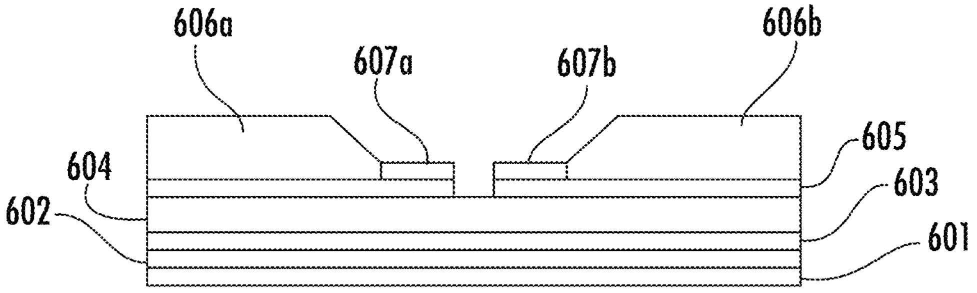
FIG. 2 shows a cross-section of the antenna assembly (not to scale).

FIG. 2 shows a cross-section of the antenna assembly (not to scale). The antenna assembly includes a flexible polymer substrate 604, such as a polyimide substrate or any substrate with a flexible or bendable body. A solder mask layer 603 is applied to an underside of the flexible polymer substrate. An adhesive layer 602 is applied to an underside of the solder mask layer in accordance with the illustration. A liner 601 is applied to the adhesive layer as shown forming the bottom surface of the antenna assembly. Still further, a copper layer 605, according to the design shown in FIG. 1, is provided on a top surface of the flexible polymer substrate 604 as shown. Conductive pads **607*a*, 607*b* and solder mask 606*a*, 606*b* each are applied to the copper layer 605**, thereby forming a top surface of the antenna assembly. While the illustrated example enables those having skill in the art to make and use the invention, it will be recognized by the same that certain variations may be implemented without departing from the spirit and scope of the invention.

Figure 3:
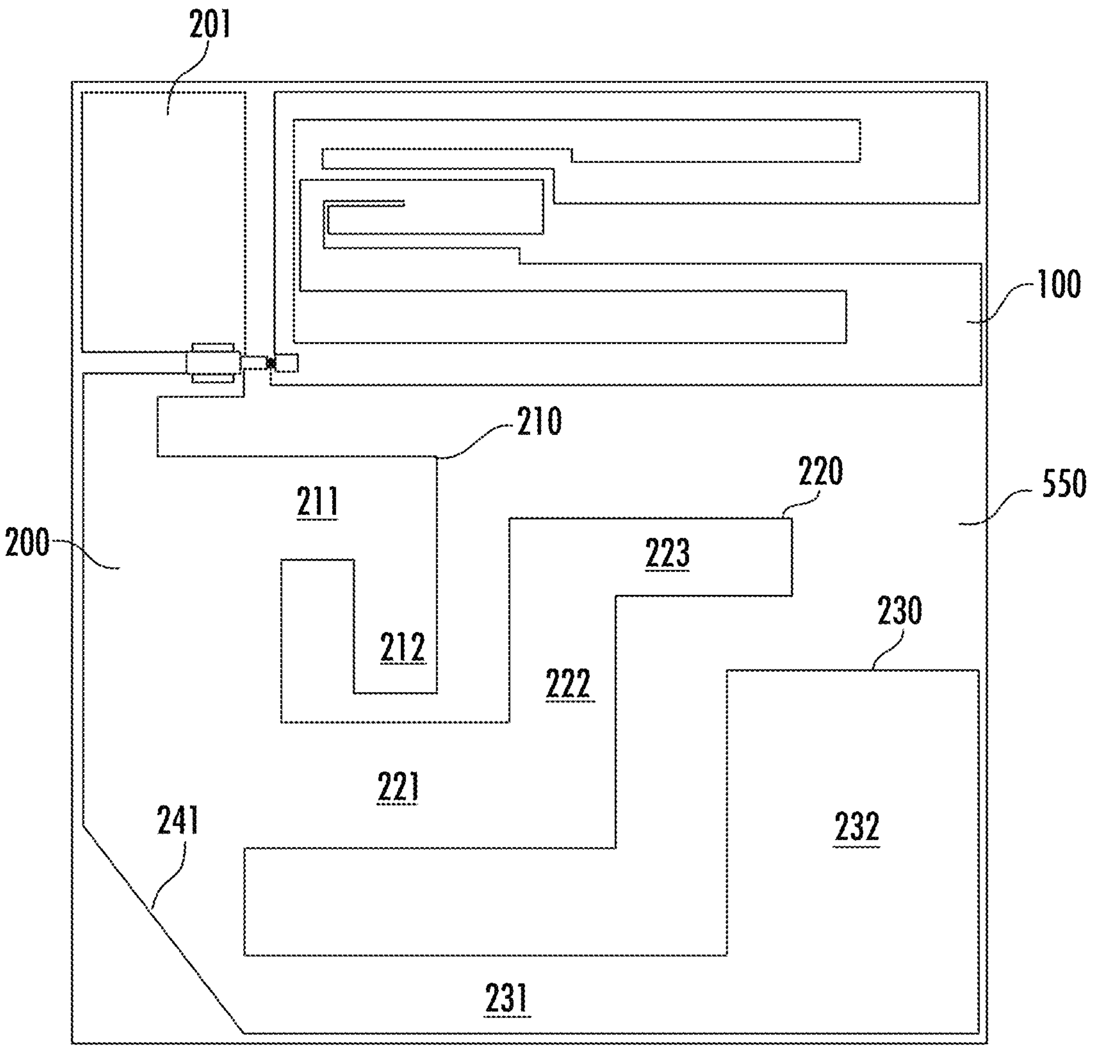
FIG. 3 further shows the ground conductor and multiple resonating portions associated therewith.

FIG. 3 further shows the ground conductor and multiple resonators associated therewith. Here, the ground conductor includes a ground patch 201 positioned adjacent to the radiating element 100 of the antenna assembly.

Moving downward along a first edge of the antenna assembly as shown, a first ground resonator 210 extends horizontally from the edge along a first body portion 211 and is bent at a right angle toward a first terminal portion 212.

A second ground resonator 220 extends from the first edge of the antenna assembly as shown, the second ground resonator including a second horizontal body portion 221, a second vertical body portion 222, and a second terminal portion 223. The second ground resonator includes a length greater than that of the first ground resonator. The second ground resonator is also positioned along the ground conductor at a distance that is greater than that of the first ground resonator. The second vertical body portion 222 of the second ground resonator 220 is aligned parallel with the first terminal portion 212 of the first ground resonator, with a first gap extending therebetween.

A third ground resonator 230 extends from the ground conductor 200 forming a third horizontal body portion 231 which is oriented parallel with respect to the second horizontal body portion 221 of the second ground conductor, and a third vertical body portion 232 extending perpendicularly from the third horizontal body portion 231. The third ground resonator includes a length that is larger than each of the first and second ground resonators, respectively. Moreover, the third ground conductor is positioned at a distance from the radiating element 100 that is larger than that of the first and second ground resonators, respectively. A second gap is formed between the second ground resonator and the third ground resonator. The ground conductor 200 further includes cleave portion 241 extending between the first edge and the third ground resonator at an angle less than ninety degrees.

Referring back to FIG. 1, the coaxial cable 500 has a length larger than that of each of the first through third ground resonators, and is positioned further away from the radiating element 100 compared to each of the first through third ground resonators.

As used herein, each of the terms "horizontal", "vertical", "parallel" and/or "perpendicular", or variations of these terms such as "horizontally", etc., are used with reference to the specific orientation as shown in the corresponding illustrations.

Figure 4:
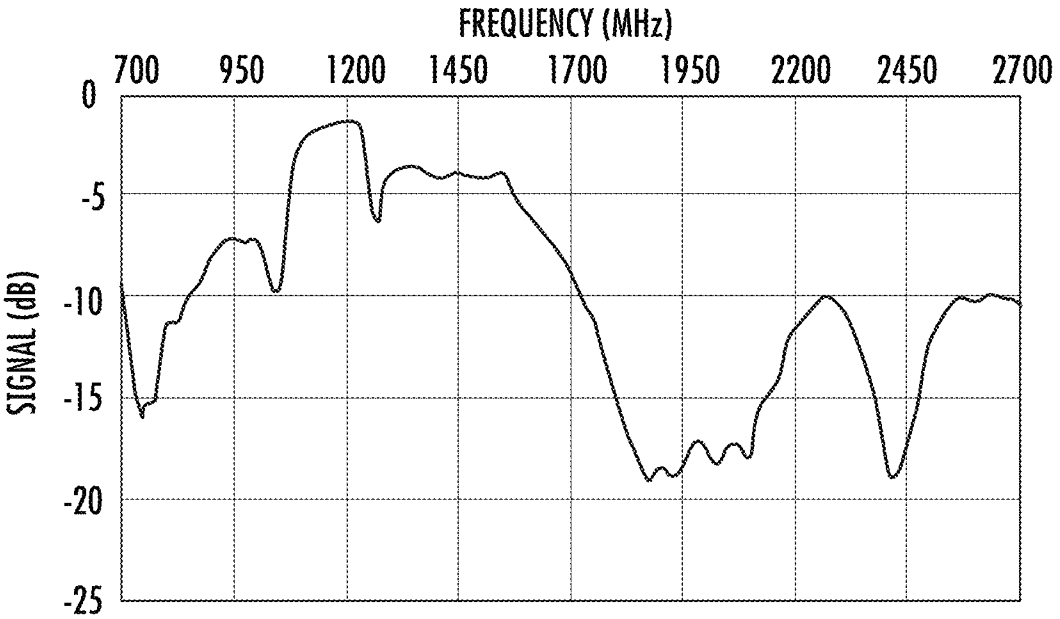
FIG. 4 shows a plot of return loss generated from the antenna assembly of FIGS. 1-3.

FIG. 4 shows a plot of return loss generated from the antenna assembly of FIGS. 1-3. The antenna has resonances between 700 MHz and 2700 MHz as illustrated.

Figure 5:
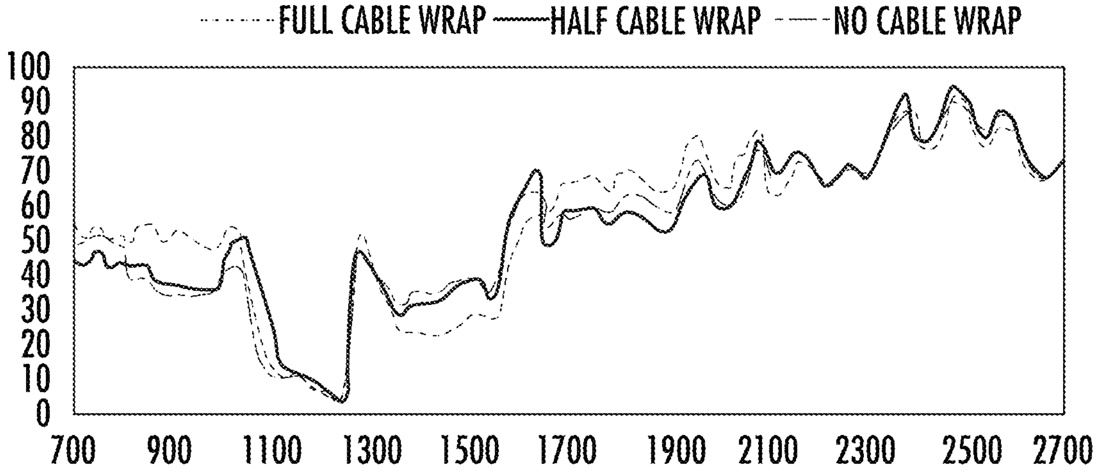
FIG. 5 shows a plot of efficiency of the antenna assembly of FIGS. 1-3.

FIG. 5 shows a plot of efficiency of the antenna assembly of FIGS. 1-3.

Figure 6:
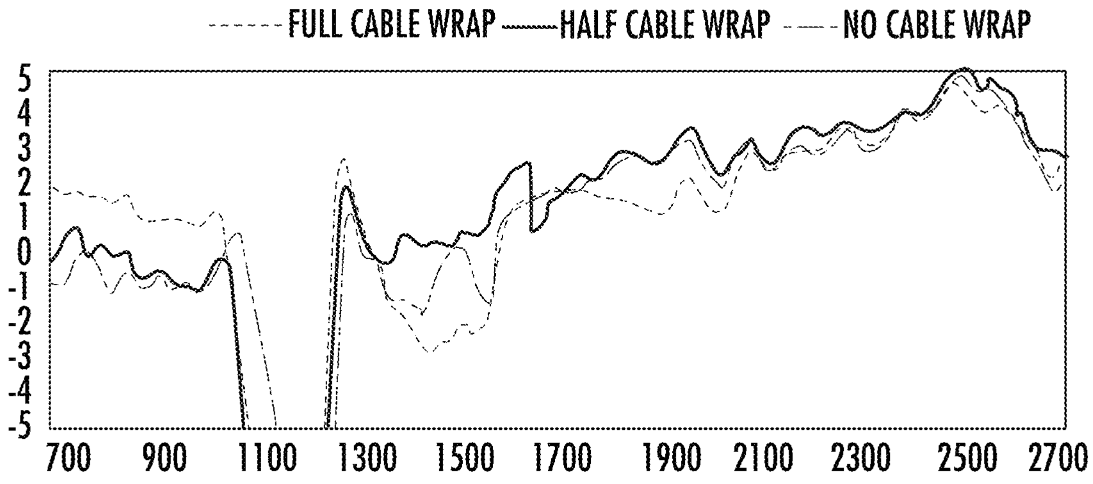
FIG. 6 shows a plot of peak gain associated with the antenna assembly of FIGS. 1-3.

FIG. 6 shows a plot of peak gain associated with the antenna assembly of FIGS. 1-3.

INDUSTRIAL APPLICABILITY

The instant antenna assembly as disclosed herein provides useful efficiency and performance in the wide band between 700 MHz and 2700 MHZ, which can be used in cellular communications among other communication networks.

REFERENCE SIGNS LIST

100 antenna radiating element
200 ground conductor
201 ground patch
210 first ground resonator (sub-element)
211 first body portion
212 first terminal portion
220 second ground resonator (sub-element)
221 second horizontal body portion
222 second vertical body portion
223 second terminal portion
230 third ground resonator (sub-element)
231 third horizontal body portion
232 third vertical body portion
241 cleave portion
401 ground element
402 feed
500 coaxial cable
501 connector
550 substrate
601 liner
602 adhesive layer
603 solder mask layer
604 flexible polymer substrate
605 copper layer
606*a*; 606*b* solder mask
607*a*; 607*b* conductive pads

The invention claimed is:

1. An antenna, comprising:

a substrate comprising a top portion, a left portion, a bottom portion and a right portion;

a radiating element supported by the substrate, with at least a portion of the radiating element being disposed proximate the top portion and the right portion of the substrate;

a ground conductor supported by the substrate, with at least a portion of the ground conductor being disposed proximate the left portion and the bottom portion of the substrate, the ground conductor further comprising:

a first ground sub-element having a first length;

a second ground sub-element having a second length that is greater in length than the first length of the first ground sub-element, the first ground sub-element located between the second ground sub-element and the radiating element; and a third ground sub-element having a third length that is greater in length than the first length of the first ground sub-element, the second ground sub-element located between the third ground sub-element and the first ground sub-element.

2. The antenna of claim 1, wherein the first ground sub-element further comprises:

a first segment that extends from adjacent the left portion of the substrate towards the right portion of the substrate; and a second segment that extends from an end of the first segment towards the bottom portion of the substrate.

3. The antenna of claim 2, wherein the second ground sub-element further comprises:

a third segment that extends from adjacent the left portion of the substrate towards the right portion of the substrate;

a fourth segment that extends from an end of the third segment towards the top portion of the substrate; and a fifth segment that extends from an end of the fourth segment towards the right portion of the substrate.

4. The antenna of claim 3, wherein the third ground sub-element further comprises:

a sixth segment that extends from adjacent the left portion of the substrate towards the right portion of the substrate, the sixth segment also being disposed adjacent the bottom portion of the substrate; and a seventh segment that extends from an end of the sixth segment towards the top portion of the substrate, the seventh segment also being disposed adjacent the right portion of the substrate.

5. The antenna of claim 4, wherein the radiating element further comprises a feed point that is disposed at a corner of the radiating element that is positioned towards the left portion of the substrate and adjacent the first ground sub-element.

6. The antenna of claim 5, wherein the feed point of the radiating element marks a line of demarcation between a first radiating arm of the radiating element and a second radiating arm of the radiating element.

7. The antenna of claim 6, wherein the first radiating arm further comprises a first radiating arm segment that extends from the feed point of the radiating element towards the right portion of the substrate.

8. The antenna of claim 7, wherein the first radiating arm further comprises a second radiating arm segment that extends from an end of the first radiating arm segment towards the top portion of the substrate.

9. The antenna of claim 8, wherein the first radiating arm further comprises a third radiating arm segment that extends from an end of the second radiating arm segment towards the left portion of the substrate.

10. The antenna of claim 9, wherein the first radiating arm further comprises a fourth radiating arm segment that extends from an end of the third radiating arm segment towards the top portion of the substrate.

11. The antenna of claim 10, wherein the first radiating arm further comprises a fifth radiating arm segment that extends from an end of the fourth radiating arm segment towards the right portion of the substrate.

12. The antenna of claim 11, wherein the first radiating arm further comprises a sixth radiating arm segment that extends from an end of the fifth radiating arm segment towards the bottom portion of the substrate.

13. The antenna of claim 12, wherein the first radiating arm further comprises a seventh radiating arm segment that extends from an end of the sixth radiating arm segment towards the left portion of the substrate.

14. The antenna of claim 13, wherein the second radiating arm further comprises a first radiating arm segment that extends from the feed point of the radiating element towards the top portion of the substrate.

15. The antenna of claim 14, wherein the second radiating arm further comprises a second radiating arm segment that extends from an end of the first radiating arm segment of the second radiating arm towards the top portion of the substrate.

16. The antenna of claim 15, wherein the second radiating arm further comprises a third radiating arm segment that extends from an end of the second radiating arm segment of the second radiating arm towards the bottom portion of the substrate.

17. The antenna of claim 16, wherein the second radiating arm further comprises a fourth radiating arm segment that extends from an end of the third radiating arm segment towards the left portion of the substrate.

18. The antenna of claim 17, wherein the second radiating arm further comprises a fifth radiating arm segment that extends from an end of the fourth radiating arm segment towards the left portion of the substrate.

19. The antenna of claim 18, wherein the fifth radiating arm segment of the first radiating arm is positioned adjacent the first radiating arm segment of the second radiating arm.

20. The antenna of claim 19, wherein the sixth radiating arm segment of the first radiating arm is positioned adjacent the fifth radiating arm segment of the second radiating arm.

* * * * *